United States Patent
Kimura

[11] Patent Number: 5,630,277
[45] Date of Patent: May 20, 1997

[54] PORTABLE, POWER DRIVEN PUNCHING MACHINE HAVING AN AIMING BEAM

[75] Inventor: Kiyoshi Kimura, Fujisawa, Japan

[73] Assignee: Kabushiki Kaisha Ogura, Japan

[21] Appl. No.: 498,360

[22] Filed: Jul. 5, 1995

[30] Foreign Application Priority Data

Aug. 18, 1994 [JP] Japan ................. 6-194212

[51] Int. Cl.⁶ .................. B26D 5/12; B26F 1/36
[52] U.S. Cl. ............. 30/362; 83/520; 83/639.5; 30/277.4
[58] Field of Search .............. 83/520, 521, 582, 83/587, 639.1, 639.2, 639.5, 590; 30/360, 361, 362, 358, 366, 277.4, 180, 210, 228

[56] References Cited

U.S. PATENT DOCUMENTS

| | | | |
|---|---|---|---|
| 2,536,709 | 1/1951 | Ashton et al. | 30/361 X |
| 3,008,234 | 11/1961 | Mattera | 30/361 X |
| 3,089,375 | 5/1963 | Williamson | 83/590 X |
| 3,425,219 | 2/1969 | Oliver et al. | 30/360 X |
| 3,863,341 | 2/1975 | Ramer | 30/358 X |
| 4,107,541 | 8/1978 | Kirsch | |
| 4,399,675 | 8/1983 | Erdmann et al. | |
| 4,573,834 | 3/1986 | Nasu | 83/521 X |
| 4,667,411 | 5/1987 | McCallum | 30/362 X |
| 4,893,536 | 1/1990 | Kinoshita | 83/521 X |
| 4,998,351 | 3/1991 | Hartmeister | 30/228 X |
| 5,375,495 | 12/1994 | Bosten et al. | 83/520 X |
| 5,416,975 | 5/1995 | Saito et al. | 30/362 X |

FOREIGN PATENT DOCUMENTS

| | | |
|---|---|---|
| 272840 | 6/1988 | European Pat. Off. . |
| 2606378 | 9/1976 | Germany . |
| 9416535.1 | 12/1994 | Germany . |
| WO87/00776 | 2/1987 | WIPO . |

*Primary Examiner*—Rinaldi I. Rada
*Assistant Examiner*—Boyer Ashley
*Attorney, Agent, or Firm*—Dickstein Shapiro Morin & Oshinsky LLP

[57] ABSTRACT

A machine having a hydraulic, single acting, spring return cylinder for moving a punch toward and away from a die in order to cut a hole in a steel frame member or the like. A laser is built into the machine for emitting an aiming beam from the punch. A hole can be punched exactly in position on the work by projecting the aiming beam to a preformed mark thereon.

9 Claims, 4 Drawing Sheets

PORTABLE, POWER DRIVEN PUNCHING MACHINE HAVING AN AIMING BEAM

BACKGROUND OF THE INVENTION

This invention relates generally to machines for punching holes, and particularly to portable, power driven punching machines of the class suitable for working on steel frame members at sites of construction. More particularly, the invention pertains to such punching machines featuring provisions for emitting an aiming beam with a view to punching exactly in position on the work.

Portable, hydraulic punching machines, complete with a pump and an electric drive motor therefor, have been known and used extensively for creating holes in steel beams or strips or like frame members of various cross sectional shapes at construction sites. Such machines are more or less alike in that a punch is moved back and forth by a hydraulic cylinder with respect to a fixed die for punching the work being held against the die.

Difficulties have been encountered in use of such punching machines. In some, if not all, cases, holes must be punched exactly in marked positions on steel frame members. Conventionally, the puncher has had to rely solely on his eyes in aiming at the marking on the work. Such visual aiming has made punching operation very difficult and, sometimes, inaccurate.

Another objection to the prior art concerns the return valve incorporated in the hydraulic cylinder of single acting, spring return type for moving the punch back and forth. Mounted to the piston of the hydraulic cylinder, the return valve functions to release the fluid from the fluid chamber into the spring chamber at the end of the extension stroke of the piston, thereby permitting the piston to be sprung back to the normal position on its contraction stroke.

Conventionally, the return valve was opened by the energy stored in two springs as they were compressed during the extension stroke of the piston. These springs had to be of very heavy make, however, because the return valve had to be opened in opposition to the force of the pressurized fluid acting on the valve head.

SUMMARY OF THE INVENTION

It is therefore among the objects of this invention to enable the puncher to aim far more accurately at the marking on the work than heretofore.

Another object of the invention is to make the return valve more simpler in construction but more positive and reliable in operation for smoother punching.

Briefly, the invention may be summarized as a punching machine comprising a fixed die, a punch having an axis, and drive means for moving the punch along its axis toward and away from the die in order to cut a hole in the work being held therebetween. Also provided is a light source such as, typically, a laser for projecting an aiming beam from a light passageway extending axially through the punch.

Therefore, in use of the punching machine, the puncher may simply adjust the aiming beam to a marking on the work. A hole will be created exactly in the marked position by then triggering the drive means for thrusting the punch toward the die.

The light passageway need not be straight but may be bent or curved on its way to the location of the laser or like light source. The light from the light source may then be directed to the exit end in the punch by an optical fiber or a reflector.

The light source can therefore be disposed in any convenient position on the machine. The use of a laser beam is preferred because of its sharply defined spot of small diameter, contributing to more precise punching.

The above and other features and advantages of this invention and the manner of realizing them will become more apparent, and the invention itself will best be understood, from a study of the following description and appended claims, with reference had to the attached drawings showing some preferable embodiments of the invention.

DESCRIPTION OF THE PREFERRED EMBODIMENTS

Figure 1:
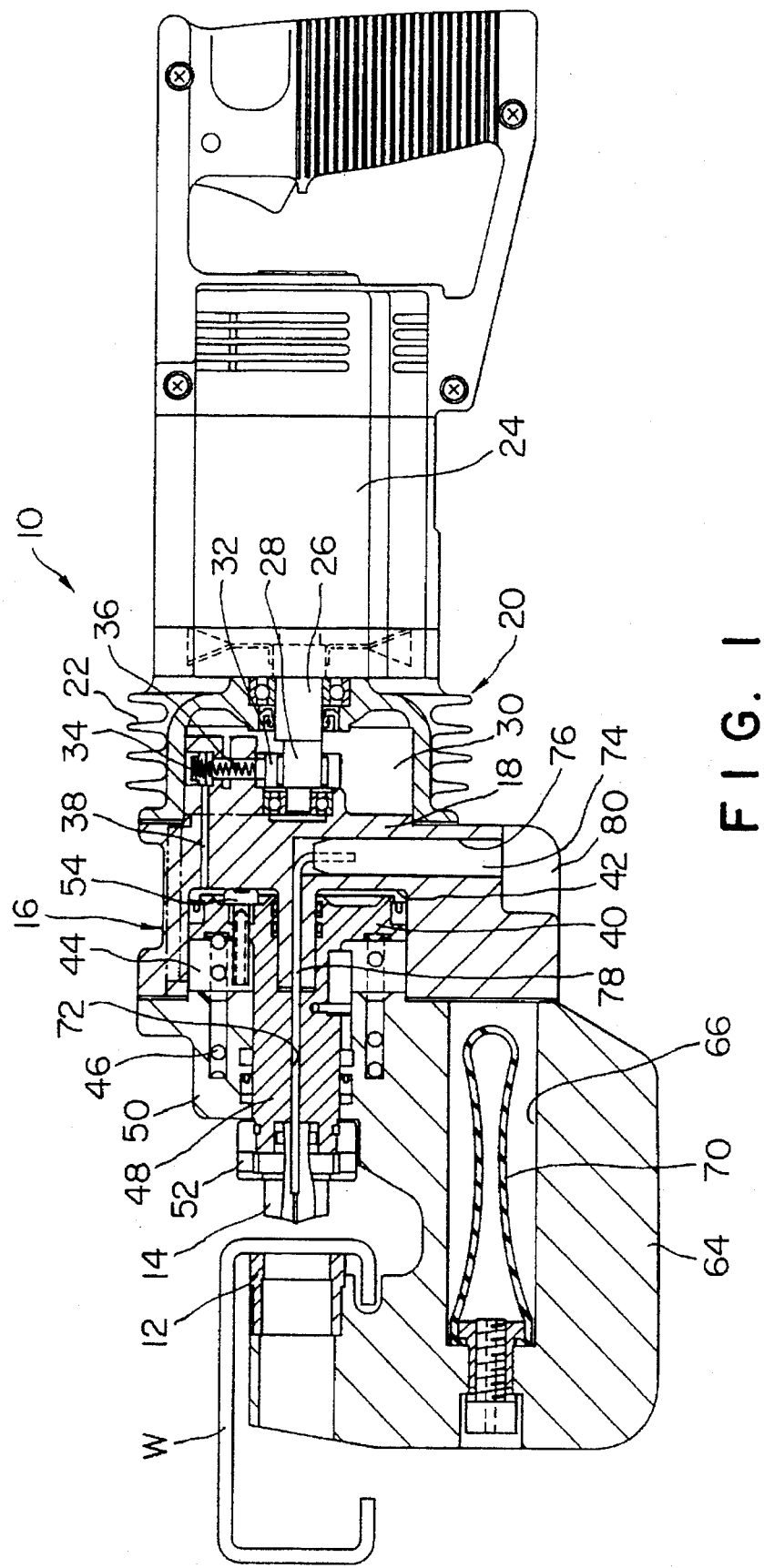
FIG. 1 is a section through the portable, power driven punching machine constructed in accordance with the novel concepts of the invention.

The general construction of the representative punching machine according to the invention will be understood from a consideration of FIG. 1. Generally designated 10, the punching machine is therein shown together with work W in the form of a channel to be punched. The work W is shown positioned on a die 12. A punch 14 is to be thrust forwardly, or to the left as viewed in this figure, for cutting a hole in the work W on the die 12.

Figure 2:
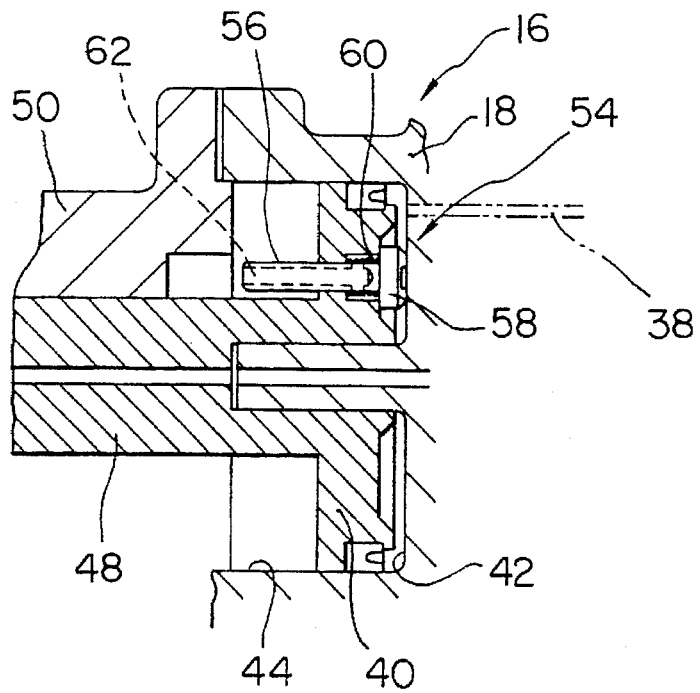
FIG. 2 is an enlarged, fragmentary section, taken along the same plane as FIG. 1, showing in particular the return valve of the hydraulic cylinder incorporated with the punching machine, the hydraulic cylinder being shown fully contracted, with the return valve closed.
Figure 3:
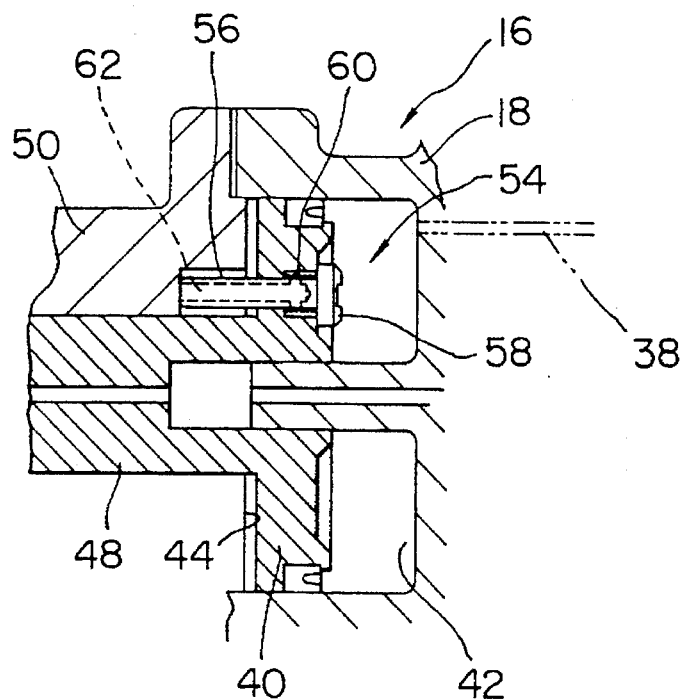
FIG. 3 is a view similar to FIG. 2 except that the hydraulic cylinder is shown fully extended, with the return valve partly opened.
Figure 4:
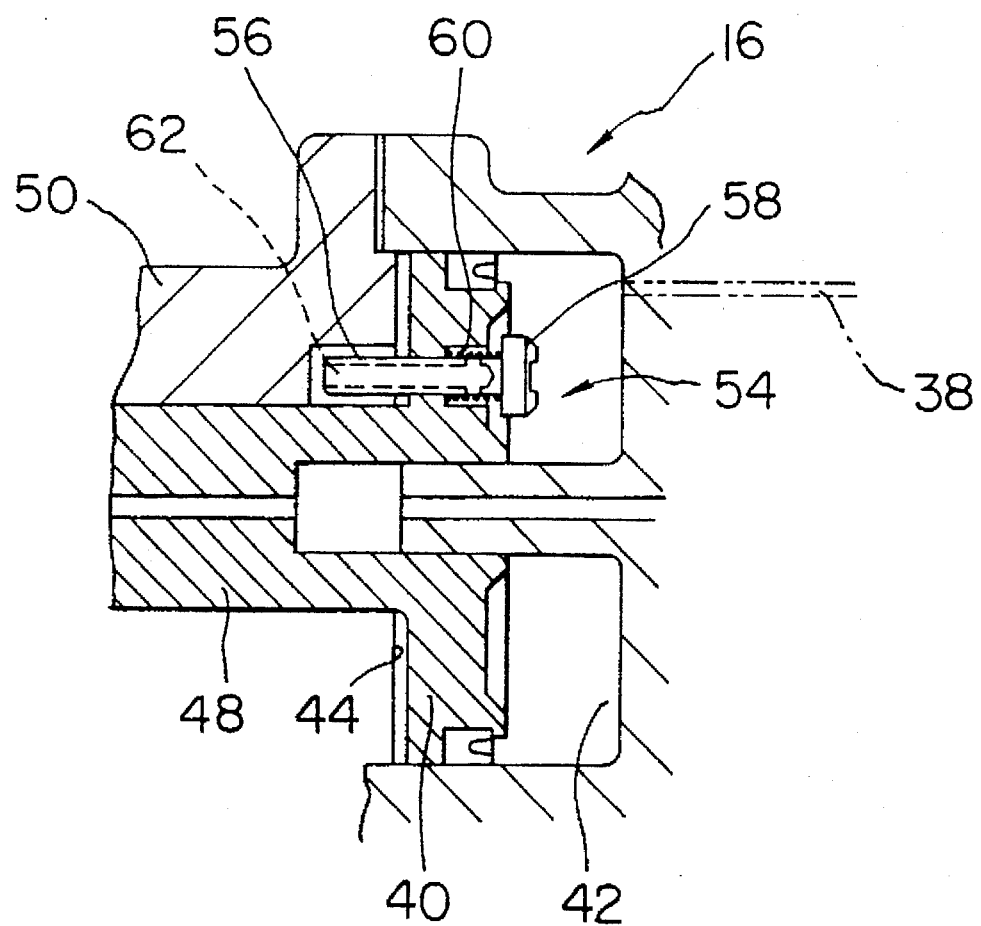
FIG. 4 is a view similar to FIG. 3 except that the return valve is shown fully opened.

Employed for driving the movable cutting bit back and forth is a hydraulic cylinder 16, shown also in FIGS. 2–4, of the familiar single acting, spring return type built into a body 18 of the punching machine 10. The hydraulic cylinder 16 is itself driven by a pump 20 having a casing 22 mounted to the rear end of the body 18. The hydraulic pump 20 is driven in turn by an electric motor 24 further on the back of the pump.

The motor 24 has an armature shaft 26 rotatably extending through the rear end wall of the pump casing 22 and terminating in an eccentric camshaft 28. This camshaft is disposed in a hydraulic fluid chamber 30 within the pump casing 22 which is to be filled with a hydraulic fluid such as oil. The pump 20 comprises a piston 32 driven by the camshaft 30 for reciprocation in the fluid chamber 30, and a check valve 34, complete with a spring 36, which permits the flow of pressurized fluid from the fluid chamber into a fluid passageway 38 extending through the body 18 toward the hydraulic cylinder 16.

The hydraulic cylinder 16 has a piston 40 slidably mounted in a hollow created in the body 18. The piston 40 divides the hollow into a fluid chamber 42 and a spring chamber 44. The cylinder fluid chamber 42 communicates with the pump fluid chamber 30 by way of the passageway 38. The spring chamber 44 accommodates a return spring shown as a helical compression spring 46. The piston 40 together with a piston rod 48 is therefore to be thrust forwardly by the pressurized fluid from the pump 20 and retracted by the return spring 46. The piston rod 48 pressure-tightly extends through, and projects outwardly of, the front wall 50 of the cylinder 16 and has the punch 14 keyed at 52 to its front end.

As shown on an enlarged scale in FIGS. 2–4, the piston 40 has a return valve 54 built into it for returning the hydraulic fluid from cylinder fluid chamber 42 back into pump fluid chamber 30. The return valve 54 has a valve stem 56 slidably extending through a hole formed in the piston 40 parallel to the cylinder axis, and a valve head 58 formed on one end of the valve stem and disposed in the cylinder fluid chamber 42 for movement into and out of fluid tight contact with the piston 40. A helical compression spring 60 is sleeved upon part of the valve stem 56 for biasing the valve head 58 out of contact with the piston 40. The valve stem 56 has formed therein a fluid passageway 62 having a fluid inlet adjacent the valve head 58 on one end thereof, and a fluid outlet at the other end of the valve stem.

Normally, or when the piston 40 is in the position of FIG. 2 under the force of the return spring 46 which is not shown in this figure, the return valve 54 is closed, holding the cylinder fluid chamber 42 out of communication with the spring chamber 44. Then, at the end of the extension stroke, the valve stem 56 will butt endwise against the end wall of the spring chamber 44, as pictured in FIG. 3. The valve head 58 will then be slightly unseated from the piston 40, permitting the pressurized fluid to flow from the cylinder fluid chamber 42 into the passageway 62. The pressurized fluid will hit the end wall 50 of the spring chamber 44 on flowing out the passageway 62 into the spring chamber 44. Thus the return valve 54 will be fully opened, as in FIG. 4, by the resultant of the force of the biasing spring 60 and the reaction of the pressurized fluid hitting the spring chamber end wall 50.

It will therefore be appreciated that the return valve 54 requires but one compression spring 60, compared with two such springs heretofore needed, in order to be unseated from the piston 40.

With reference back to FIG. 1 a jaw 64 extending forwardly from, and formed in one piece with, the front wall 50 of the cylinder 16. The die 12 is secured to the jaw 64, in a position opposite the punch 14. A cushioning chamber 66 is formed in the jaw 64 in communication with the cylinder spring chamber 44. The cushioning chamber 66 accommodates an air bag 70 which is capable of elastic deformation to cushion the impact of the forward travel of the cylinder piston 40.

FIG. 1 also reveals a light passageway 72 extending axially through the punch 14 and piston rod 48 and further through the body 18 to the location of a light source such as a laser 74 received in a space 76 in the body. The space 76 extends at a right angle to the light passageway 72. An optical fiber 78 extends from laser 74 to punch 14 through the light passageway 72 for directing the laser beam therethrough and irradiating the work W on the die 12. A photoelectric amplifier 80 may be mounted to the body 18 in combination with the laser 74.

Such being the construction of the punching machine 10 according to the invention, the work W to be punched may first be positioned on the die 12 as shown in FIG. 1. Then the laser 74 may be activated to throw an aiming beam to the work W. If the aiming beam does not fall on the marking on the work, the position of this work may be readjusted on the die 12 so that the aiming beam may come into exact register with the marking. A registration of the aiming beam with the marking means that the work has been positioned with its marking in alignment with the axis of the punch 14, because the aiming beam is emitted from the passageway 72 extending axially through the punch axis.

Now the electric motor 24 may be switched on. With the consequent rotation of the motor armature shaft 26 together with the camshaft 30, the piston 32 of the hydraulic pump 20 will pressurize the fluid in the fluid chamber 30 for delivery to the fluid chamber 42 of the hydraulic cylinder 16 via the check valve 34 and passageway 38. The pressurized fluid on flowing into the cylinder fluid chamber 42 will force the piston 40 forwardly against the bias of the return spring 46 from its FIG. 2 position to that of FIG. 3. Thus thrust forwardly with the piston rod 48, the punch 14 will cut a hole in the work W on the die 12.

Toward the end of the forward stroke of the piston 40, the return valve stem 56 will hit the cylinder end wall 50, so that the valve head 58 will be slightly unseated from the piston. Then the pressurized fluid in the cylinder fluid chamber 42 will flow into the passageway 62 in the valve stem 56 and out against the cylinder end wall 50. The reaction of the pressurized fluid striking the cylinder end wall 50 will combine with the force of the biasing spring 60 to cause the valve head 58 to be fully unseated from the piston 40, as shown in FIG. 4.

Thereupon the pressurized fluid will flow from the cylinder fluid chamber 42 back into the pump fluid chamber 30 through the return valve 54 as the piston 40 travel back to the FIG. 2 position under the force of the return spring 46. The punch 14 will retract to the FIG. 1 position with the return stroke of the piston 40. One cycle of punching operation has now been completed.

The valve head 58 will hit the rear end of the cylinder 16 toward the end of the return stroke of the piston 40 and be subsequently seated against the piston 40 against the force of the biasing spring 60. The cylinder fluid chamber 42 has now been pressure tightly closed pending the inflow of the pressurized fluid from the pump 20 upon commencement of the next cycle of operation.

Figure 5:
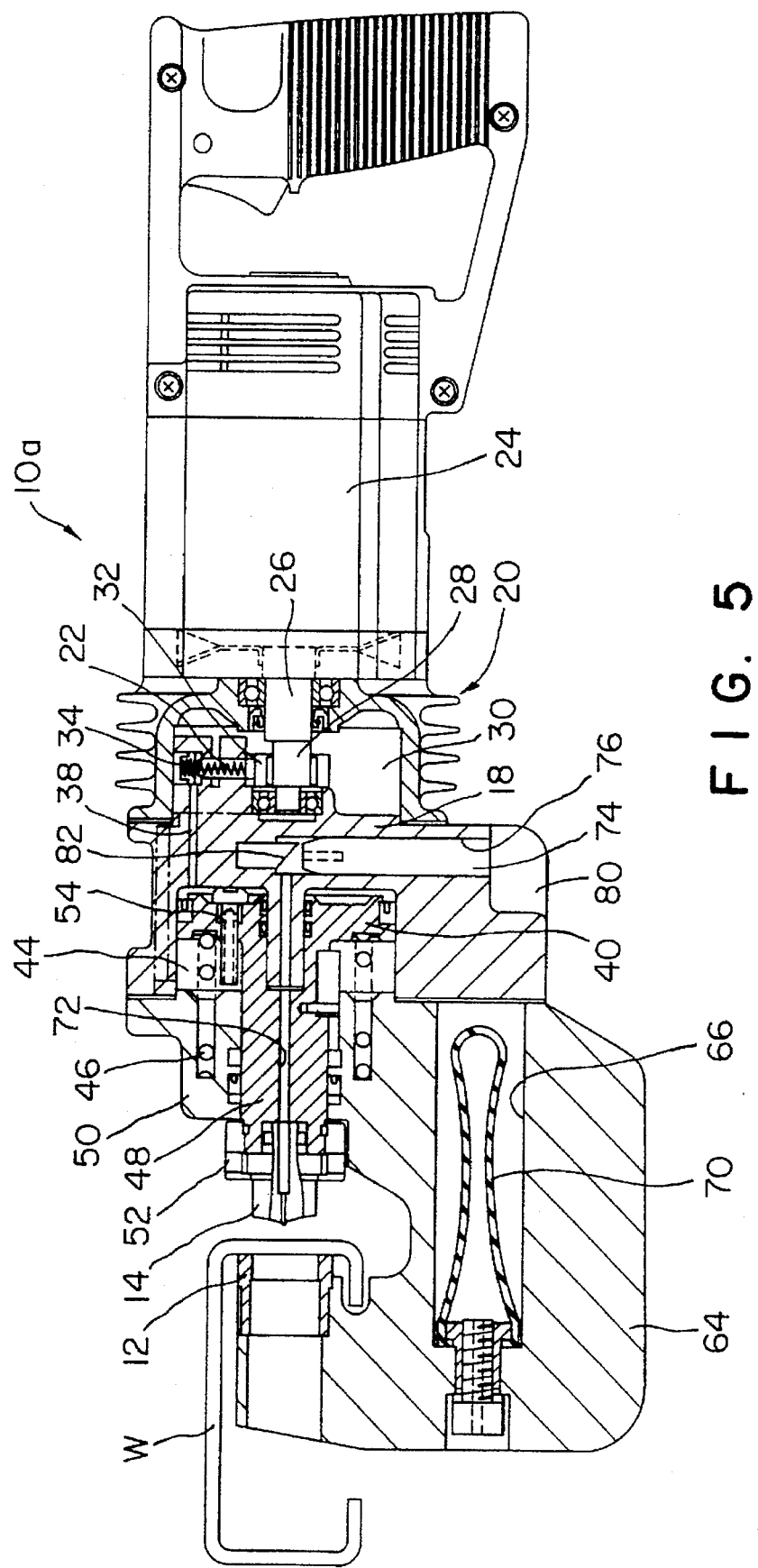
FIG. 5 is a view similar to FIG. 1 but showing another preferred form of punching machine according to the invention.

FIG. 5 illustrates another preferred form of punching machine 10a according to the invention. The modified punching machine 10a features a reflector 82 employed in substitution for the optical fiber 78 of the first disclosed punching machine 10. Disposed at the right angular bend of the light passageway 72 in the body 18, the reflector 82 serves to redirect the beam from the laser 74 toward the exit end of the passageway at the punch 14. The aiming beam thus emitted from the punch 14 is similar to the one obtained by use of the optical fiber 78, enabling the puncher to aim exactly at the marking on the work W. The punching machine 10a is akin to the machine 10 in the other details of construction and operation.

Despite the foregoing detailed disclosure, it is not desired that the invention be limited by the exact showing of the drawings or the description thereof. For example, the light passageway 72 need not be bent right angularly but could be bent at other angles, curved, or straight depending upon the location of the light source or upon the type of additional means such as an optical fiber or reflector in use. The light source is also not limited to a laser, but other suitable means such as a halogen cycle lamp might be employed as desired or required. All these and other modifications or alterations within the usual knowledge of the specialists are intended in the foregoing disclosure, so that the invention should be construed broadly and in a manner consistent with the fair meaning or proper scope of the following claims.

What is claimed is:

1. A punching machine for cutting holes in a work, comprising:
   (a) a die;
   (b) a punch having an axis;
   (c) drive means for moving the punch along the axis thereof toward and away from the die so as to be capable of cutting a hole in a work held between the die and the punch;
   wherein the drive means comprises:
      a pump for supplying a fluid under pressure to the fluid actuated cylinder; and
      a fluid actuated cylinder having a piston coupled to the punch wherein the fluid actuated cylinder has a fluid chamber and a spring chamber on opposite sides of the piston, the fluid chamber, being in fluid communication with the pump, for receiving the pressurized fluid therefrom in order to cause the punch to move toward the die, the spring chamber accommodating a return spring for causing the punch to move away from the die;
   (d) a light passageway extending through the axis of the punch and opening toward the die;
   (e) a light source for projecting an aiming beam from the light passageway in the punch toward the die so as to be capable of aiding in the creation of a hole in a required position on the work; and
   (f) a return valve assembly comprising:
      a return valve comprising a valve stem slidably extending through a hole formed in the piston, and a valve head formed on one end of the valve stem and disposed in the fluid chamber, the valve head being movable with the stem into and out of fluid tight contact with the piston;
      a fluid passageway formed in the valve stem capable of permitting fluid flow from the fluid chamber into the spring chamber when the valve head is out of contact with the piston, the fluid passageway being open to the spring chamber at another end of the valve stem;
      a spring for biasing the valve head out of contact with the piston; and
      the valve stem butting endwise against an end wall of the spring chamber upon full admission of the pressurized fluid into the fluid chamber, with the consequent movement of the valve head out of contact with the piston, so that the valve head is unseated from the piston both by a force of the biasing spring and by a reaction of the pressurized fluid flowing out the fluid passageway against the end wall of the spring chamber, thereby permitting the punch to travel away from the die under the force of the return spring.

2. The punching machine of claim 1 further comprising an optical fiber for directing a light emitted by the light source into and through the light passageway in the punch, whereby the light source is capable of being disposed in a position offset from the axis of the punch.

3. The punching machine of claim 1 wherein the light source is disposed in a position offset from the axis of the punch, and wherein the punching machine further comprises a reflector for directing a light emitted by the light source into the light passageway in the punch.

4. The punching machine of claim 1 wherein the light source is a laser.

5. A punching machine for cutting holes in a work, comprising:
   (a) a die;
   (b) a punch having an axis;
   (c) drive means for moving the punch along the axis thereof toward and away from the die so as to be capable of cutting a hole in a work held between the die and the punch;
   wherein the drive means comprises:
      a fluid actuated cylinder having a piston coupled to the punch; and
      a pump for supplying a fluid under pressure to the fluid actuated cylinder.
   (d) a light passageway extending through the axis of the punch and opening toward the die;
   (e) a light source for projecting an aiming beam from the light passageway in the punch toward the die so as to be capable of aiding in the creation of a hole exactly in a required position on the work; and
   (f) a return valve assembly comprising:
      a return valve having a valve stem slidably extending through a hole formed in the piston, and a valve head formed on one end of the valve stem and disposed in the fluid chamber, the valve head being movable with the stem into and out of fluid tight contact with the piston;
      a fluid passageway formed in the valve stem capable of permitting fluid flow from the fluid chamber into the spring chamber when the valve head is out of contact with the piston, the fluid passageway being open to the spring chamber at another end of the valve stem;
      a spring for biasing the valve head out of contact with the piston; and
      the valve stem butting endwise against an end wall of the spring chamber upon full admission of the pressurized fluid into the fluid chamber, with the consequent movement of the valve head out of contact with the piston, so that the valve head is unseated from the piston both by a force of the biasing spring and by the reaction of the pressurized fluid flowing out the fluid passageway against the end wall of the spring chamber, thereby permitting the punch to travel away from the die under the force of the return spring.

6. The punching machine of claim 5 further comprising an optical fiber for directing a light emitted by the light source into and through the light passageway in the punch, whereby the light source is capable of being disposed in a position offset from the axis of the punch.

7. The punching machine of claim 5 wherein a light source is disposed in a position offset from the axis of the punch, and wherein the punching machine further comprises a reflector for directing the light emitted by the light source into the light passageway in the punch.

8. The punching machine of claim 5 wherein the light source is a laser.

9. The punching machine of claim 5 wherein the fluid actuated cylinder comprises the pump and a spring chamber on opposite sides of the piston, the fluid chamber, being in communication with the pump, for receiving the pressurized fluid therefrom in order to cause the punch to move toward the die, the spring chamber accommodating a return spring for causing the punch to move away from the die.

* * * * *